United States Patent
Venkataraman

(10) Patent No.: US 9,124,454 B1
(45) Date of Patent: *Sep. 1, 2015

(54) METHOD AND APPARATUS FOR ADAPTIVELY DETERMINING SETTINGS OF A TRANSMIT EQUALIZER

(71) Applicant: MARVELL INTERNATIONAL LTD., Hamilton (BM)

(72) Inventor: Jagadish Venkataraman, San Jose, CA (US)

(73) Assignee: MARVELL INTERNATIONAL LTD. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/280,948

(22) Filed: May 19, 2014

Related U.S. Application Data

(63) Continuation of application No. 12/951,278, filed on Nov. 22, 2010, now Pat. No. 8,743,940.

(60) Provisional application No. 61/293,101, filed on Jan. 7, 2010.

(51) Int. Cl.
*H04L 25/03* (2006.01)

(52) U.S. Cl.
CPC .......... *H04L 25/03* (2013.01); *H04L 25/03019* (2013.01); *H04L 25/03057* (2013.01)

(58) Field of Classification Search
USPC ............................ 375/233, 232, 297, 346, 350
See application file for complete search history.

(56) References Cited

U.S. PATENT DOCUMENTS

| | | |
|---|---|---|
| 4,424,533 A | 1/1984 | Rzeszewski |
| 5,345,476 A | 9/1994 | Tsujimoto |
| 5,481,564 A | 1/1996 | Kakuishi et al. |
| 5,561,687 A | 10/1996 | Turner |
| 5,870,484 A | 2/1999 | Greenberger |
| 5,937,007 A | 8/1999 | Raghunath |
| 5,946,351 A | 8/1999 | Ariyavisitakul et al. |
| 7,426,236 B1 | 9/2008 | He |
| 7,639,749 B2 | 12/2009 | Gupta et al. |
| 2009/0103669 A1 | 4/2009 | Kolze et al. |
| 2010/0020860 A1 | 1/2010 | Dai et al. |

OTHER PUBLICATIONS

M. Li, et al., "FIR Filter Optimisation as Pre-Emphasis of High-Speed Backplane Data Transmission", Electronics Letters, Jul. 8, 2004, vol. 40, No. 14 (2 pgs).

*Primary Examiner* — Kabir A Timory

(57) ABSTRACT

Systems, methods, and other embodiments associated with adaptively determining settings of a transmit equalizer are described. According to one embodiment, a method includes removing, from a signal received from a first device, a signal contribution of a transmit equalizer to produce a residual signal. The method includes generating revised tap coefficients based, at least in part, on the residual signal. The method includes providing settings that are based, at least in part, on the revised tap coefficients to the transmit equalizer in the transmitter of a second device that is across a channel on which the signal is provided.

17 Claims, 5 Drawing Sheets

METHOD AND APPARATUS FOR ADAPTIVELY DETERMINING SETTINGS OF A TRANSMIT EQUALIZER

CROSS REFERENCE TO RELATED APPLICATIONS

This disclosure is a continuation of U.S. Non-Provisional application Ser. No. 12/951,278 filed on Nov. 22, 2010, now U.S. Pat. No. 8,743,940 which claims benefit under 35 USC §119(e) to U.S. provisional application Ser. No. 61/293,101 filed on Jan. 7, 2010, which is hereby wholly incorporated by reference.

BACKGROUND

In high-speed serial interfaces, channels (and associated connectors) introduce significant intersymbol interference (ISI) by causing amplitude attenuation and group delay distortion. Feed forward equalizers (FFEs) are often used in receiver architecture to compensate for the ISI caused by the channels. However, when the FFE must provide significant high-frequency boosting, the FFE can introduce noise and aggressor power enhancement. The noise enhancement caused by an FFE can be mitigated by performing a portion of the channel equalization at the transmitter using a transmit equalizer.

SUMMARY

In one embodiment an apparatus includes a coefficient adapter configured to remove a signal component from a signal received from a transmitter to produce a residual signal. The signal component is added to the signal by a transmit equalizer of the transmitter that functions according to tap coefficients. The coefficient adapter is configured to generate settings for modifying the tap coefficients at the transmitter as a function of the residual signal. The apparatus includes an adjuster configured to adaptively adjust the tap coefficients of the transmit equalizer by providing the settings to the transmitter. The transmitter provides the signal across a channel.

In another embodiment, a method includes removing, from a signal received from a first device, a signal contribution of a transmit equalizer to produce a residual signal. The method includes generating revised tap coefficients based, at least in part, on the residual signal. The method includes providing settings that are based, at least in part, on the revised tap coefficients to the transmit equalizer in the transmitter of a second device that is across a channel on which the signal is provided.

In another embodiment, a device includes a coefficient adapter configured to compute revised tap coefficients based, at least in part, on a residual signal that is recovered from a transmitted signal received from a transmitter over a channel that separates the device and a transmitting device. The device includes an adjuster configured to provide the revised tap coefficients from the device to the transmitter in the transmitting device to revise tap coefficients in use at the transmitter. The device receives the signals from the transmitting device over the channel that separates the device from the transmitting device.

BRIEF DESCRIPTION OF THE DRAWINGS

The accompanying drawings, which are incorporated in and constitute a part of the specification, illustrate various systems, methods, and other embodiments of the disclosure.

It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
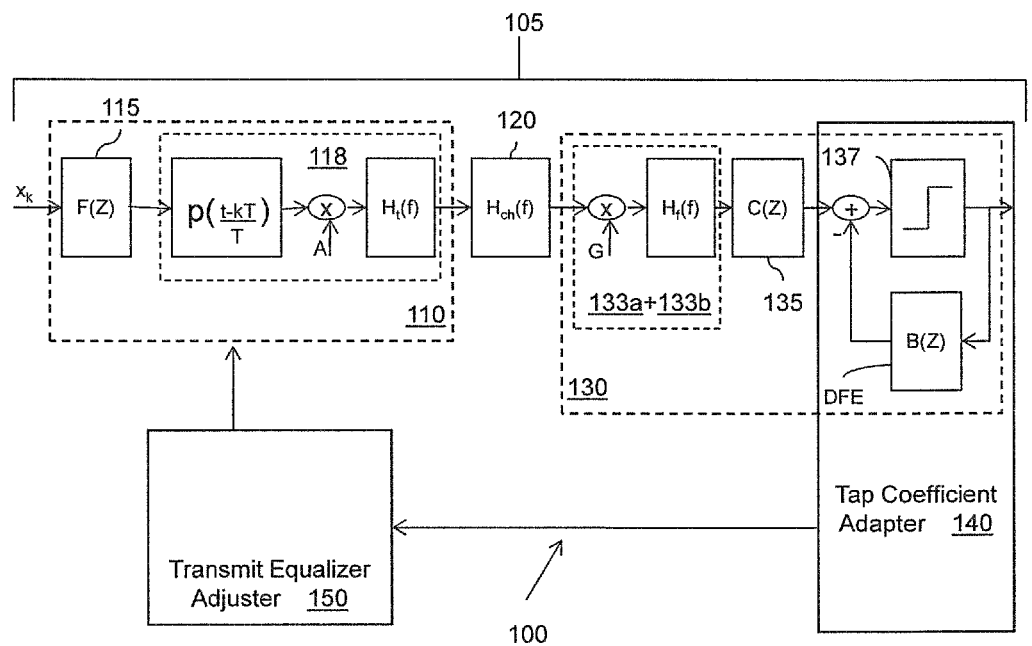
FIG. 1 illustrates one embodiment of an apparatus associated with adaptive determination of transmit equalizer settings.

With reference to FIG. 1, one embodiment of an apparatus 100 is shown that is associated with adaptive determination of transmit equalizer settings. A backplane 105 includes a transmitter 110 that inputs a digital signal $x_k$ and transmits a corresponding analog signal through a channel 120 to a receiver 130. As discussed in the Background, the channel 120 introduces intersymbol interference (ISI) which is compensated for using channel equalization techniques.

The transmitter 110 includes a transmit equalizer 115 that processes $x_k$ according to a transfer function F(Z) that is selected to perform a portion of channel equalization. The transmit equalizer may be implemented as a finite impulse response (FIR) filter that functions according to one or more tap coefficients. The transmitter 110 also includes a digital to analog converter (DAC) 118 that converts a digital output from the transmit equalizer 115 into an analog signal based on an amplitude input A. An impulse response of the transmitter 110 is denoted in FIG. 1 as $H_t(f)$.

An impulse response of the channel 120 is denoted as $H_{ch}(f)$. During operation of the backplane 105, the impulse response of the channel $H_{ch}(f)$ may change. Because the transmit equalizer 115 aims to compensate for the effects of the channel 120 on signals passing between the transmitter 110 and the receiver 130, transmit equalizer settings are adaptively determined based on an estimated channel response, as will be described in more detail below. In one embodiment, the transmitter 110 and the receiver 130 are located in separate devices that are remote to each other and separated by the channel 120. Accordingly, the transmitter 110 is, for example, located in a remote device from the receiver 130.

The receiver 130 includes a programmable gain amplifier (PGA) 133a and analog to digital converter (ADC) 133b. The PGA amplifies the analog signal from the channel 120 based on a gain input G. The receiver also includes a feed forward equalizer (FFE) 135 that processes a digital signal output by the PGA 133a and the ADC 133b. The FFE 135 processes signals according to a transfer function C(Z) that is selected to perform a complementary portion of channel equalization with respect to the transmit equalizer transfer function F(Z).

In the described embodiment, adaptive determination of transmit equalizer settings is performed by adaptively revising tap coefficients associated with the transmit equalizer 115. A tap coefficient adaptor 140 computes revised tap coefficients. The revised tap coefficients may be computed by minimizing an error generated by subtracting an input to a slicer 137 from an output of the slicer 137 (which may be further processed by a decision feedback equalizer (DFE) 139).

As part of the error minimization process, the tap coefficient adapter 140 computes a residual signal by removing a signal contribution of the transmit equalizer 115 from the output signal of the FFE 135. Removing the signal contribution of the transmit equalizer 115 means removing the effect that the transmit equalizer 115 has on the output of the FFE 135. The tap coefficient adapter 140 uses the residual signal to compute the revised tap coefficients. Revised tap coefficient settings that are based on the revised tap coefficients are provided to the transmit equalizer 115 by a transmit equalizer adjuster 150.

Figure 2:
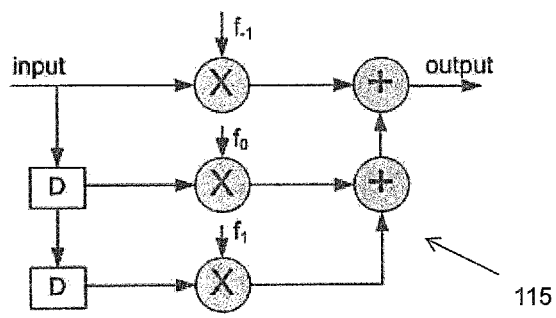
FIG. 2 illustrates one embodiment of a transmit equalizer.

FIG. 2 is a schematic illustration of an FIR filter that implements one embodiment of the transmit equalizer 115. The FIR filter sums weighted, incrementally time-delayed samples of an input signal. Each time-delayed sample is weighted according to an associated tap coefficient. In one embodiment, three tap coefficients $f_{-1}, f_0, f_1$ are implemented. The tap coefficient $f_{-1}$ (also called the precursor tap) is applied to a present time input sample. Tap coefficient $f_0$ is applied to an input sample delayed by one sample period. Tap coefficient $f_1$ (also called the postcursor tap) is applied to an input sample delayed by two sample periods. An FIR filter that functions according to a desired transfer function can be implemented by adjusting the tap coefficients. The desired transfer function of the transmit equalizer 115 FIR filter will change as channel characteristics change, thus the tap coefficients ($f_{-1}, f_0, f_1$) are adaptively determined during operation of the backplane 105. While three taps are used for purposes of this description, any number of taps may be used to implement a transmit equalizer.

Implementation Details for Three-tap Transmit Equalizer

In one embodiment, the input to the three-tap filter (i.e., transmit equalizer 115) shown in FIG. 2 is the binary data sequence $x_k$ that is to be transmitted to the receiver 130. Given this sequence, x, the output of the transmit equalizer at instant k is given by $\sum_{j=-1}^{1} f_j x_{k-j}$. Throughout this description, taps $f_{-1}$ and $f_1$ are assumed to be either negative or zero, as is the case with most backplanes that employ transmit equalizers. When complying with the IEEE 802.3ap standard, the peak power of the transmitter is fixed. Assuming the DAC (118) gain to be A, the peak positive amplitude at the DAC output is A ($f_{-1}-f_0-f_1$). If the peak amplitude cannot exceed ±A, then:

$$A(f_0-f_{-1}-f_1) \le A, \Rightarrow (f_0-f_{-1}-f_1) \le 1. \qquad \text{Equation 1}$$

Tap Range for $f_{-1}$ and $f_1$

Given the peak power constraint in Equation 1, the minimum value that can be assigned to the precursor and postcursor taps during the adaptation process is constrained as follows. The backplane channel introduces frequency-dependent insertion loss such that the higher frequencies are significantly more attenuated than frequencies close to DC. Hence, the dynamic range of the incoming signal to the ADC 133b is dominated by the low-frequency content of the transmitted signal.

The steady-state voltage at the DAC 118 output for very low-frequency data is $A(f_{-1}+f_0+f_1)$. Assuming that the insertion loss at such frequencies is almost 0 dB, the dynamic range at the ADC (133b) input is given by $\pm AG(f_{-1}+f_0+f_1)$, where G is the gain of the PGA 133b. Denoting the dynamic range at the ADC input by ±D gives, $$AG(f_0+f_{-1}+f_1)=D$$

As the precursor and/or postcursor taps become more negative, the PGA 133a has to provide higher gain to meet the dynamic range requirement of the ADC 133b. If the maximum PGA gain is $G^{max}$, the above equation becomes:

$$AG^{max}(f_0+f_{-1}+f_1)=D \qquad \text{Equation 2}$$

The minimum value for the precursor is obtained when the postcursor tap is 0 and vice versa. Assuming $f_1=0$, the minimum value for $f_{-1}$ is given by:

$$AG^{max}(f_0 + f_{-1}^{min}) = D, \qquad \text{Equation 3}$$
$$\Rightarrow AG^{max}(1 + 2f_{-1}^{min}) =$$
$$\qquad D \text{ (from equality constraint in (1)),}$$
$$\Rightarrow f_{-1}^{min} = \left(\frac{D}{AG^{max}} - 1\right)\bigg/2.$$

In one embodiment, when both the precursor and postcursor taps are non-zero, they satisfy the following inequality constraint:

$$(f_{-1} + f_1) \ge \underbrace{\left(\frac{D}{AG^{max}} - 1\right)\bigg/2.}_{\phi} \qquad \text{Equation 4}$$

Figure 3:
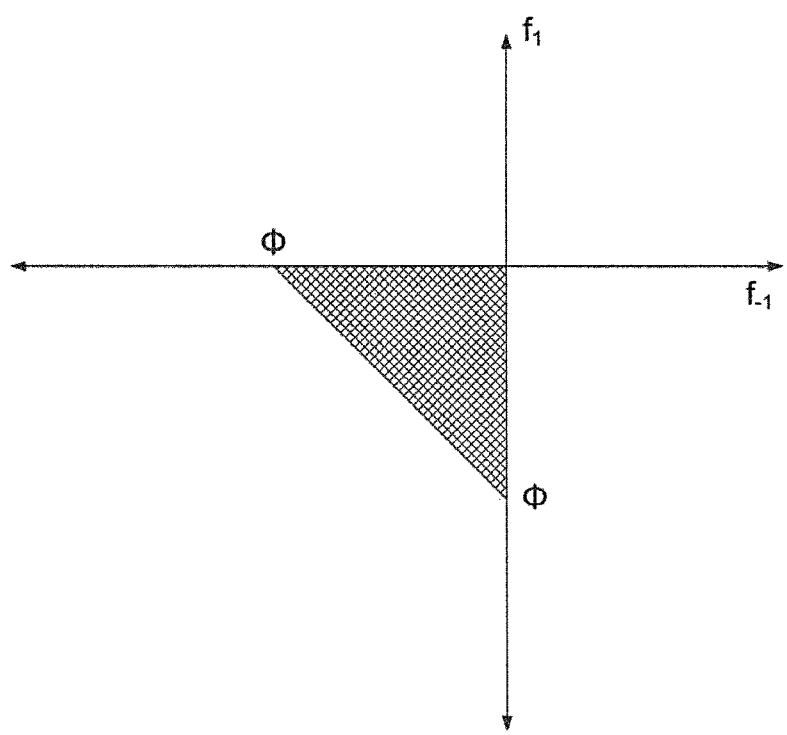
FIG. 3 illustrates a constrained solution space for one embodiment of adaptive determination of transmit equalizer settings.

Equation 4 represents the solution space within which to search for the transmit equalizer settings that provide an optimal signal-to-noise ratio (SNR). The solution space is depicted in FIG. 3.

Figure 4:
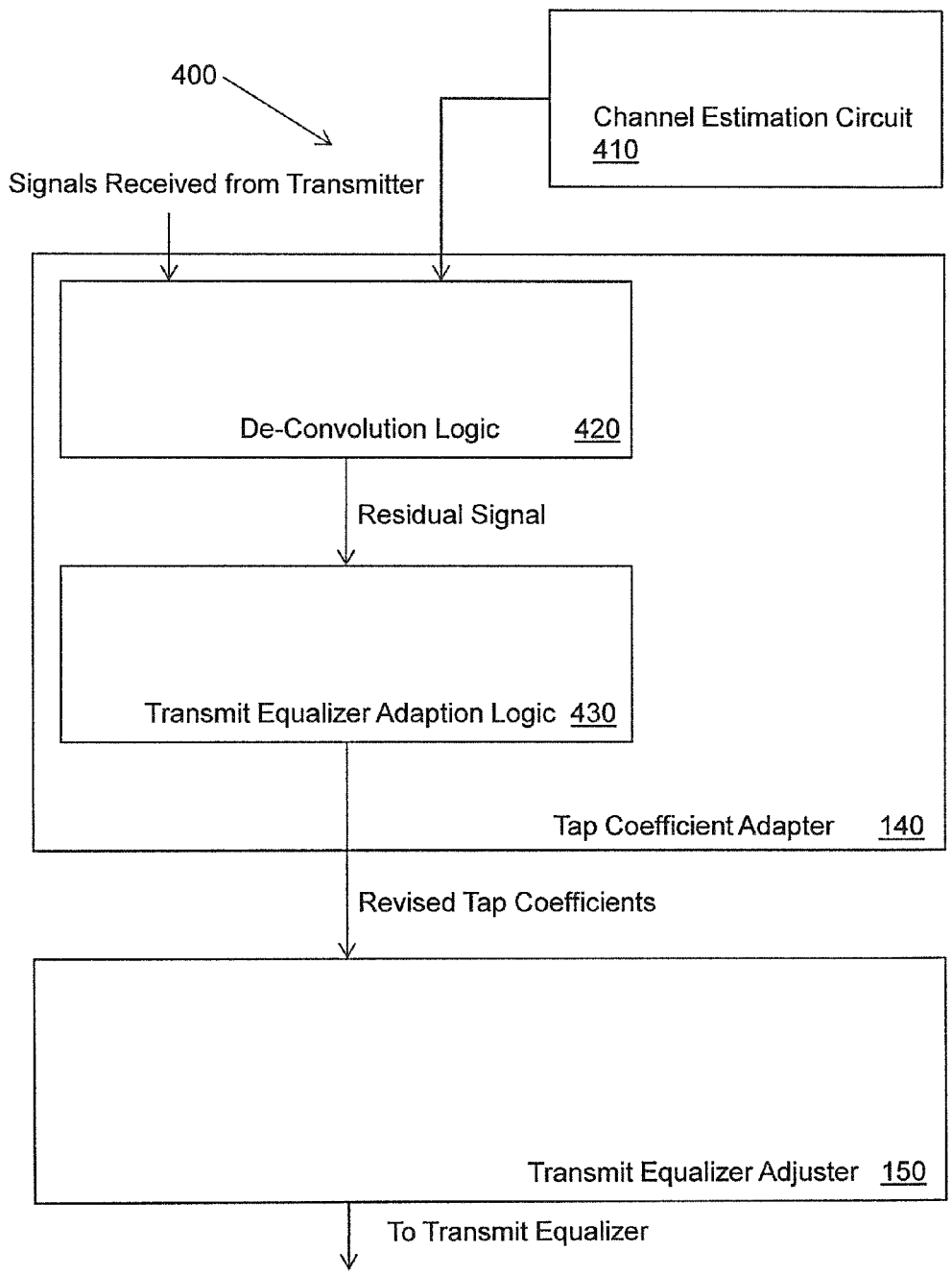
FIG. 4 illustrates one embodiment of an apparatus for associated with adaptive determination of transmit equalizer settings.

FIG. 4 illustrates an example embodiment of apparatus 400 that adaptively determines tap coefficients and provides tap coefficient settings to the transmit equalizer 115. The apparatus 400 includes the tap coefficient adapter 140 and the transmit equalizer adjuster 150 shown in FIG. 1. The tap coefficient adapter 140 is configured to remove a signal contribution of the transmit equalizer from signals received from the transmitter to produce a residual signal. The tap coefficient adapter 140 computes revised tap coefficients based on the residual signal. The transmit equalizer adjuster 150 then generates revised tap coefficient settings that are based, at least in part, on the revised tap coefficients and provides the revised settings to the transmit equalizer.

In one embodiment, the tap coefficient adapter 140 includes a de-convolution logic 420 and a transmit equalizer adaptation logic 430. The de-convolution logic is configured to produce the residual signal by de-convolving the signal contribution of the transmit equalizer 115 from an output of the FFE 135. The de-convolving is based, at least in part, on an estimated channel response of the channel 120. The transmit equalizer adaptation logic 430 is configured to compute the revised tap coefficients based on the residual signal produced by the de-convolution logic 420.

The tap coefficient adapter 140 utilizes a minimum mean-squared error (MMSE) approach to determining optimal transmit equalizer settings. For the receiver 130, the error signal is obtained by subtracting the output of the slicer 137 from the input to the slicer. This error signal is then used to adapt the transmit equalizer settings, or tap coefficients ($f_{-1}$, $f_0$, $f_1$). The MMSE based approach aims to minimize the error power, or equivalently, equates the gradient of the squared error to zero.

Figure 5:
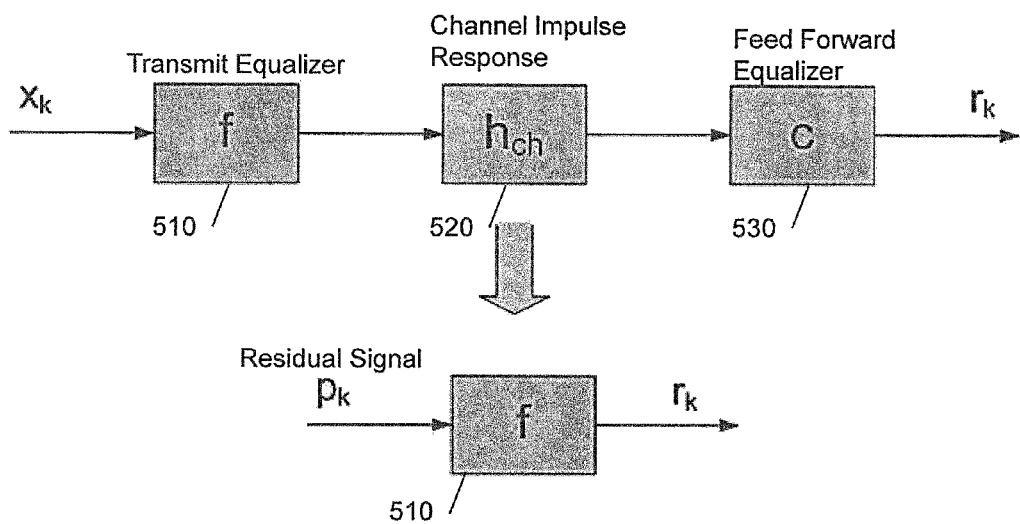
FIG. 5 illustrates an equivalent data path for signals in one embodiment of adaptive determination of transmit equalizer settings.

FIG. 5 illustrates an equivalent data path for the signal $x_k$ which is transformed into a receiver output signal $r_k$. FIG. 5 assumes that the DAC gain and the effect of the transmitter 110 (low pass filter) as well as the PGA gain and the effect of the receiver 130 (low pass filter) are absorbed into the channel model $H_{ch}(f)$) 520. Thus the input signal $x_k$ passes through the transmit equalizer 115 (modeled as an impulse response f 510), the channel model $H_{ch}(f)$ 520, and the FFE 135 (modeled as an impulse response c 530). The receiver outputs samples $r_k$. The output of the FFE 135 at instant k is the following:

$$r_k = (X * f * h_{ch} * c)_k \qquad \text{Equation 5}$$

$$= \sum_{j=-1}^{1} f_j (X * h_{ch} * c)_{k-j}$$

$$= \sum_{j=-1}^{1} f_j P_{k-j}.$$

Thus, $r_k$ is a product of f 510 (transmit equalizer) and a residual signal $p_k$ corresponding to $x_k$ as processed by the channel 120 and the FFE 135 (which is known). Given the slicer error $e_k$, the MMSE adaptation equation is give by:

$$f_j^{k+1} = f_j^k - \mu \frac{\partial e_k^2}{\partial f_j^k} \qquad \text{Equation 6}$$

$$= f_j^k - \mu e_k P_{k-j}$$

$p_{k-j}$ thus represents an output of the FFE 135 without the signal contribution of the transmit equalizer 115, or the residual signal after the signal contribution of the transmit equalizer has been de-convolved from the output of the FFE. In order to determine the residual signal $p_{k-j}$, the channel estimate, $h_{ch}$, at that instant needs to be known. This in turn depends on the sampling phase. The ideal sampling phase at each instant depends on a number of factors: the transmitter's phase, frequency errors between the transmitter and receiver, jitter, phase noise, and so on. A timing recovery loop associated with the backplane 105 tracks frequency errors and jitter within its tracking bandwidth and determines the ADC sampling phase. However, due to high-frequency jitter and some possible residual frequency errors, the ADC sampling phase can still rotate very slowly. Hence, the channel estimate is tracked continuously to determine $h_{ch}$.

Figure 6:
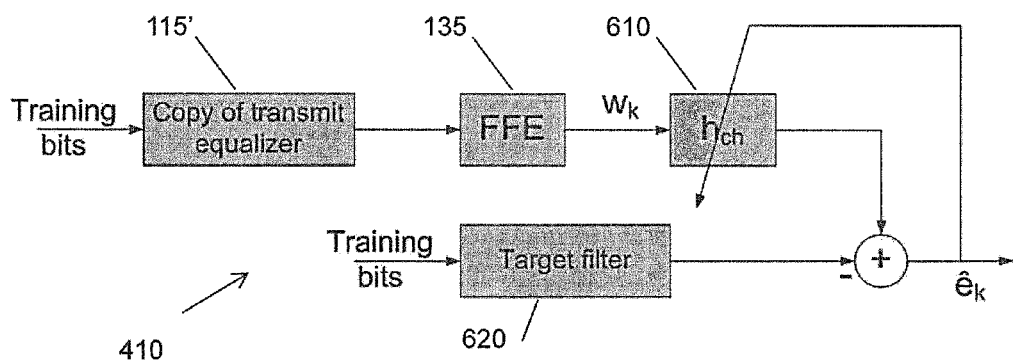
FIG. 6 illustrates one embodiment of a channel estimation circuit used in adaptive determination of transmit equalizer settings.

Referring back to FIG. 4, the apparatus 400 may also include a channel estimation circuit 410 that estimates the channel response of the channel 120. This estimated channel response, which may be an estimated instantaneous impulse response, is used by the de-convolution logic 420 to de-convolve the contribution of the transmit equalizer 415 from the output of the FFE 135. FIG. 6 illustrates one embodiment of a channel estimation circuit. The channel adaptation equation is similar to the one used to adapt the transmit equalizer and is given by:

$$\hat{h}_{ch,j}^{k+1} = \hat{h}_{ch,j}^k - v\hat{e}_k w_{k-j} \qquad \text{Equation 7}$$

In order to estimate $h_{ch}$ a copy of the transmit equalizer 115' is maintained at the receiver. This is made possible by the assumption that the transmit equalizer is initially in the {0,1,0} state and that all future requests by the receiver are implemented appropriately by the transmitter. Depending on the transmitter's response, the transmit equalizer's copy 155' at the receiver is updated accordingly. During training, the data bits are know apriori. The known data bits are passed through the copy of the transmit equalizer 115' at the receiver 130, the FFE 135 and an unknown channel estimate 610 to generate $u_k$. At the same time, these bits are passed through a target filter g 620 to produce $v_k$. The error signal $\hat{e}_k = u_k - v_k$ is then used to adapt the channel estimate. Results present in this description will hold for any general target filter, for example, multi-tap filters encountered in partial response equalization. The samples $p_{k-j}$ can now be generated using $\hat{h}_{ch}$, the FFE 135, and the known data bits.

Constrained Adaptation of the Transmit Equalizer

The transmit equalizer should satisfy the equality constraint of Equation 1 as well as the inequality constraint in Equation 3. Further, the equalizer taps should satisfy ($f_{-1}, f_1$) <<(0,0). The transmit equalizer adaptation, therefore, becomes a case of constrained optimization as follows:

$$\min_{f} e_k^2, \qquad \text{Equation 8}$$

$$\text{s.t.} \tilde{f}_1 : \phi - (f_{-1} + f_1) \leq 0,$$

$$\text{s.t.} \tilde{f}_2 : f_{-1} \leq 0,$$

$$\text{s.t.} \tilde{f}_3 : f_1 \leq 0,$$

$$\text{s.t.} \tilde{f}_4 : (f_0 - f_{-1} - f_1) = 1.$$

The minimization problem presented in Equation 8 can be solved using the method of interior points. This method requires that each of the inequality constraints be twice continuously differentiable and that the equality constraint matrix be of full rank. All of these conditions are satisfied by Equation 8. In order to incorporate the inequalities in the minimization problem, the cost function is modified as follows:

$$\min_{f} \left( e_k^2 + \sum_{i=1}^{3} I_-(\tilde{f}_i) \right) \qquad \text{Equation 9}$$

Here $I_-(\bullet)$ is the indicator function defined as $I_- = 0$, for $u \leq 0$ and $I_-(u) = \infty$, for $u > 0$. Since the indicator function is not differentiable, an approximation in the form of a logarithmic barrier function is used to replace the indicator function as follows:

$$\min_{f} \underbrace{\left( e_k^2 - (1/t) \sum_{i=1}^{3} \log(-\tilde{f}_i) \right)}_{L} \qquad \text{Equation 10}$$

Here, t is a parameter of choice. As $t \to \infty$, the logarithmic barrier function tends to the indicator function itself. The equality constraint can be rewritten as follows:

$$(f_0 - f_{-1} - f_1) = 1, \quad \text{Equation 11}$$

$$\Rightarrow (-1, 1, -1) \begin{pmatrix} f_{-1} \\ f_0 \\ f_1 \end{pmatrix} = 1, \text{ or,}$$

equivalently $A^T f = F$.

Defining $f_0 = [0,1,0]$ and given the new cost function, the LMS adaptation of the transmit equalizer taps are carried out by using a gradient search. The update equation for the taps is the following:

$$f_j^{k+1} = P\left[f_j^k - \mu \frac{\partial L}{\partial f_j^k}\right] + f_j^0 \quad \text{Equation 12}$$

Where, $P = 1 - A(A^T A)^{-1} A^T$. The equality constraint is maintained by first orthogonalizing the constraint and the Lagrangian. After the tap values are updated, the P matrix is used to project the new tap coefficients back on to the equality constraint. This completes the tap update mechanism performed by the tap coefficient adaptor 140.

Aggregated Updates

Updating the transmit equalizer tap coefficients is performed by the transmit equalizer adjuster 150 and in one embodiment involves sending the corresponding update commands to the transmitter through the feedback channel and then waiting for the transmitter to respond. This may take a few training frames. Also, when the transmit equalizer is changed, the PGA 133a readapts to prevent the ADC 133b from clipping. Similarly, the FFE(135)/DFE(139) and the timing recovery loop will take time to re-converge since the optimum sampling phase may have changed due to the change in the transmit equalizer 115. Due to these reasons, the adaptation mechanism is changed to the following:

$$f_j^{k+1} = P\left[f_j^k - \mu \sum_{i=1}^{N} \text{sign}\left(\frac{\partial L}{\partial f_j^k}\right)\right] + f_j^0 \quad \text{Equation 13}$$

The sign-sign algorithm is used to simplify implementation. Also, instead of letting the tap coefficient update to be determined by the incoming sample at just one instant, the update performed by the transmit equalizer adjuster 150 can be determined by accumulating the gradient over N samples. This will provide some noise averaging and speed up convergence.

Figure 7:
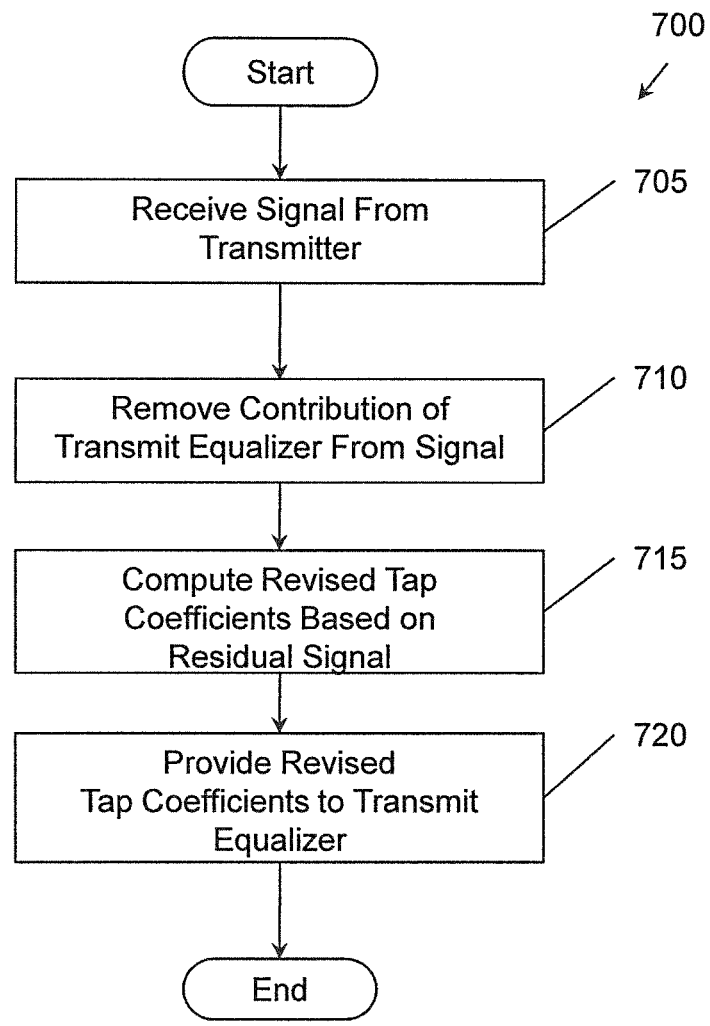
FIG. 7 illustrates one embodiment of a method for adaptively determining transmit equalizer settings.

FIG. 7 illustrates one embodiment of a method 700 of adaptively determining tap coefficients. The method includes, at 705, receiving a signal from a transmitter that includes a transmit equalizer that functions according to a plurality of tap coefficients. At 710 a contribution of the transmit equalizer is removed from the signal to produce a residual signal. At 715 the method includes computing revised tap coefficients based, at least in part, on the residual signal. At 720 the revised tap coefficient settings are provided to the transmit equalizer.

The techniques for adaptive determination of transmit equalizer settings described herein remove a contribution of the transmit equalizer from the output of the FFE and use the residual signal in the adaptation equation. Existing adaptation schemes do not remove the contribution of the transmit equalizer, nor do they provide a circuit for estimating an channel response that is used to remove the signal contribution of the transmit equalizer from the output of the FFE.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
 a coefficient adapter configured to remove a signal component from a signal received from a transmitter to produce a residual signal, wherein the signal component is added to the signal by a transmit equalizer of the transmitter that functions according to tap coefficients, and wherein the coefficient adapter is configured to generate settings for modifying the tap coefficients at the transmitter as a function of the residual signal; and an adjuster configured to adaptively adjust the tap coefficients of the transmit equalizer by providing the settings to the transmitter, wherein the transmitter provides the signal across a channel to the apparatus, wherein the adjuster is configured to accumulate a gradient of revised tap coefficients, wherein the adjuster periodically transmits the settings that are based, at least in part, on the gradient of revised tap coefficients to the transmitter, and wherein the transmitter is on a separate side of the channel from the apparatus.

2. The apparatus of claim 1, wherein the coefficient adapter is configured to remove the signal component from the signal by de-convolving the signal component from an output of a feed forward equalizer that is processing the signal, wherein the coefficient adapter is configured to de-convolve according to an estimated response of the channel, and wherein the adjuster is configured to revise the tap coefficients as a function of the residual signal.

3. The apparatus of claim 1, further comprising:

a channel estimation circuit configured to generate an estimated response of the channel, wherein the apparatus and the transmitter that is part of a remote device communicate over the channel, wherein the transmitter is in the remote device separate from the apparatus, and wherein the channel is a backplane channel.

4. The apparatus of claim 1, wherein the adjuster is configured to adaptively adjust the tap coefficients of a three-tap filter in the transmitter that is located separate from the apparatus within a device that is communicating with the apparatus.

5. The apparatus of claim 1, further comprising:

an adaptation logic configured to:

(i) compute an error by subtracting an output of a slicer from an input to the slicer, and (ii) determine revised tap coefficients based, at least in part, on the error, wherein the slicer processes the signal received from a feed forward equalizer.

6. The apparatus of claim 1, wherein the coefficient adapter is configured to determine revised tap coefficients by calculating the revised tap coefficients from a minimum mean-squared error (MMSE) adaption equation that subtracts a product of an error and the residual signal from the tap coefficients.

7. The apparatus of claim 1, wherein the coefficient adapter uses interior points to produce revised tap coefficients that satisfy constraints by computing the revised tap coefficients according to a minimum mean-squared error (MMSE) equation.

8. A method, comprising:

removing, from a signal received from a first device, a signal contribution of a transmit equalizer to produce a residual signal;

generating revised tap coefficients based, at least in part, on the residual signal; and providing settings that are based, at least in part, on the revised tap coefficients to the transmit equalizer in the transmitter of a second device that is across a channel on which the signal is provided; and estimating an impulse response of the channel by:

receiving training bits;

receiving, with a channel estimator, signals that simulate the channel;

adjusting a transfer function of the channel estimator to minimize an error between an output of the channel estimator and an output of a target filter; and determining the estimated impulse response based, at least in part, on the transfer function that produces a minimized error.

9. A method, comprising:

removing, from a signal received from a first device, a signal contribution of a transmit equalizer to produce a residual signal;

generating revised tap coefficients based, at least in part, on the residual signal; and providing settings that are based, at least in part, on the revised tap coefficients to the transmit equalizer in the transmitter of a second device that is across a channel on which the signal is provided, wherein the first device receives the signal from the second device over a channel that separates the first device from the second device, and wherein the settings are periodically provided to the transmit equalizer based, at least in part, on an accumulated gradient of revised tap coefficients that are accumulated by a revision accumulator.

10. The method of claim 9, wherein removing the signal contribution includes de-convolving the signal contribution from an output of a feed forward equalizer that is processing the signal, wherein the first device and the second device are integrated within distinct devices that communicate over the channel, and wherein the channel is a backplane channel.

11. The method of claim 9, further comprising:

estimating an impulse response of the channel through which the signal is communicated from the transmitter to the first device, and wherein removing the signal contribution includes de-convolving the signal contribution from an output of a feed forward equalizer that is processing the signal based, at least in part, on the estimated impulse response of the channel to produce the residual signal.

12. The method of claim 9, wherein generating the revised tap coefficients includes:

(i) slicing, with a slicer, signals from a feed forward equalizer that processes the signals from the transmitter, (ii) computing an error by subtracting an output of the slicer from an input to the slicer, and (iii) determining the revised tap coefficients based, at least in part, on the error.

13. The method of claim 9, wherein generating the revised tap coefficients includes using a minimum mean-squared error (MMSE) adaption that subtracts a product of an error associated with the channel and the residual signal from the tap coefficients.

14. A device comprising:

a coefficient adapter configured to compute revised tap coefficients based, at least in part, on a residual signal that is recovered from a transmitted signal received from a transmitter over a channel that separates the device and a transmitting device; and an adjuster configured to provide the revised tap coefficients from the device to the transmitter in the transmitting device to revise tap coefficients in use at the transmitter, wherein the device receives the signals from the transmitting device over the channel that separates the device from the transmitting device, wherein the adjuster includes a revision accumulator configured to accumulate a gradient of the revised tap coefficients, and wherein the adjuster periodically provides the settings to the transmitter through a feedback channel.

15. The device of claim 14, wherein the coefficient adapter comprises:
a de-convolution logic configured to produce the residual signal by de-convolving a signal contribution of a transmit equalizer from an output of a feed forward equalizer that is processing the transmitted signal, wherein the de-convolving is based, at least in part, on an estimated response of the channel, wherein the transmit equalizer is part of the transmitter, wherein the device and the transmitting device are integrated within distinct devices that communicate over the channel, and wherein the channel is a backplane channel.

16. The device of claim 14, comprising:
a duplicate equalizer of a transmit equalizer from the transmitter, wherein the duplicate equalizer is configured to receive training bits;
a feed forward equalizer configured to receive signals from the duplicate equalizer;
a channel estimator configured to receive signals from the feed forward equalizer, wherein the channel estimator is configured to simulate the channel;
an error minimization circuit configured to adjust a transfer function of the channel estimator to minimize an error between an output of the channel estimator and an output of a target filter,
wherein the error minimization circuit determines the estimated impulse response of the channel based, at least in part, on the transfer function of the channel estimator that produces a minimized error.

17. The device of claim 14, wherein the transmit equalizer adaptation logic comprises:
a slicer acting on signals produced by a feed forward equalizer that processes the signals received from the transmitter;
a slicer error calculation circuit configured to compute an error by subtracting an output of the slicer from an input to the slicer; and
a coefficient calculator that determines the revised tap coefficients based, at least in part, on the error.

\* \* \* \* \*